June 23, 1925.  1,543,631
F. TODT
SOAP DISPENSING DEVICE
Filed Sept. 1, 1922  2 Sheets-Sheet 1
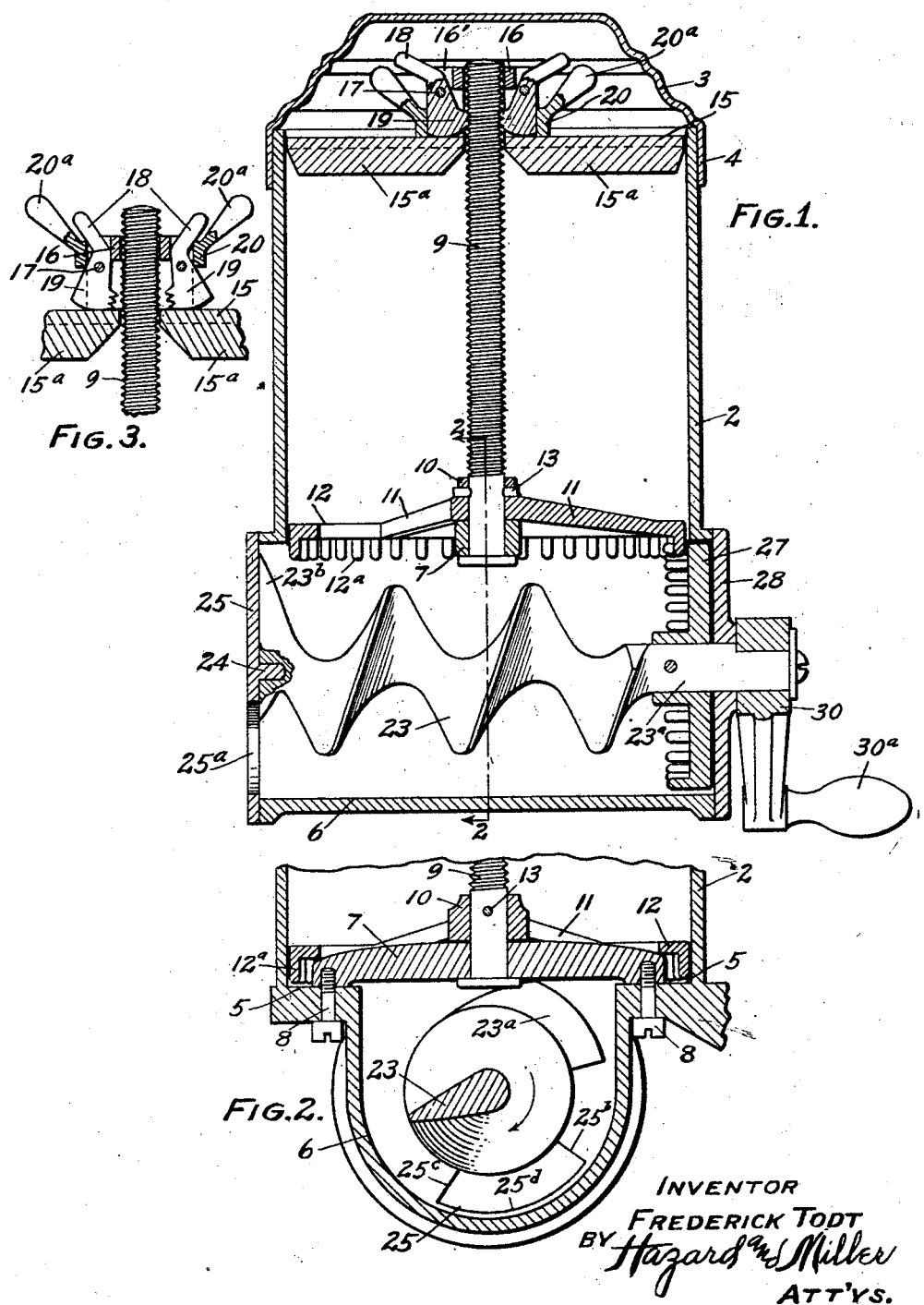
INVENTOR
FREDERICK TODT
BY Hazard and Miller
ATT'YS.

June 23, 1925.  1,543,631

F. TODT

SOAP DISPENSING DEVICE

Filed Sept. 1, 1922  2 Sheets-Sheet 2

INVENTOR
FREDERICK TODT
BY Hazard & Miller
ATT'YS.

Patented June 23, 1925.

1,543,631

UNITED STATES PATENT OFFICE.

FREDERICK TODT, OF LOS ANGELES, CALIFORNIA, ASSIGNOR TO PEERLESS SOAP COMPANY, OF LOS ANGELES, CALIFORNIA, A CORPORATION OF CALIFORNIA.

SOAP-DISPENSING DEVICE.

Application filed September 1, 1922. Serial No. 585,651.

*To all whom it may concern:*

Be it known that I, FREDERICK TODT, a citizen of Germany, residing at Los Angeles, in the county of Los Angeles and State of California, have invented new and useful Improvements in Soap-Dispensing Devices, of which the following is a specification.

This invention relates to dispensing devices, and more particularly to a device for dispensing plastic and paste-like substances more especially paste soap.

It is an object of the present invention to provide a simple, very substantial, practicable and effective device for dispensing measured or predetermined quantities of paste-like substance. Another object is to provide a paste dispensing device which will be substantially air tight so as to reserve the material in the container of the device and to prevent the same from hardening or evaporating. Another object is to provide a mechanical dispenser in which the parts are very compactly arranged and have numerous peculiar and several functions as will be fully explained more in detail later. Another object is to provide a gear mechanism of such construction and form of arrangement as to avoid clogging or filling and, therefore, providing for easy operation of the device.

A further object is to provide a container with means for positively expressing the substance being dispensed from the container chamber proper into a discharging mechanism and in which container there is arranged means coordinate with the expressing means so as to operate to advance material at a uniform rate to the pressing material and, therefore, to eliminate compression by excess of advance of material from the container to the expressing means. Another object is to provide a pressing means having capacity for uncovering an outlet opening, advancing the material thereto and then severing or cutting off the discharge.

Another object is to provide an extremely simple and practicable means for permitting the ready recharging of the container, and especially to provide a follower or presser head which may be quickly removed from its actuating means irrespective of the position of the head in the container.

Another object is to provide a presser head so that while it may be effectively actuated in its advancing function to discharge the paste from the container, the head will be prevented from rotating during operation of the device.

Another object is to provide a paste dispenser which may be used for various purposes, such for instance as the dispensing of soap, barber paste soap, lard, peanut butter, cream candy, and other characters of paste like material.

Other objects will be made manifest in the following specification of an embodiment of the invention illustrated in the accompanying drawings, in which Figure 1 is a vertical central section through the device with the follower head in its uppermost position, and showing the operating crank in its initial or starting position.

Fig. 2 is a section on line 2—2 of Fig. 1.

Fig. 3 is a detail view of the follower head retracting device.

Figure 7:
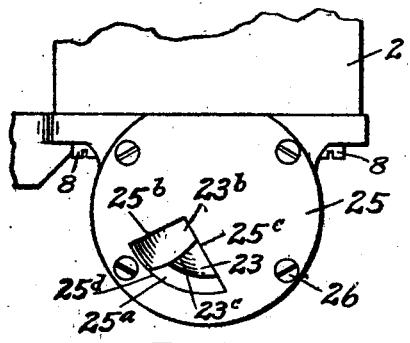
Fig. 7 is a detail end elevation of the lower portion of the device showing the discharge plate and a cutter moving across the discharge aperture.
Figure 4:
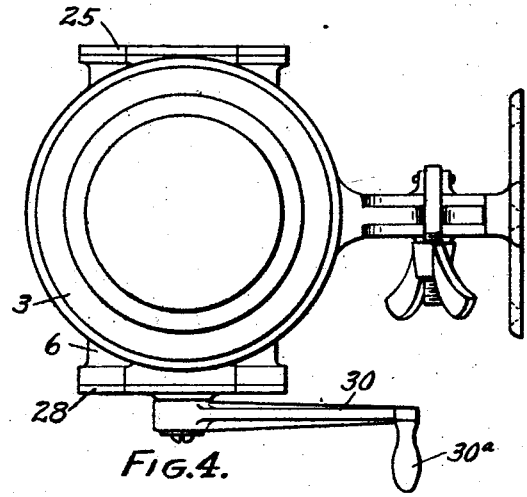
Fig. 4 is a top plan of the device.
Figure 6:
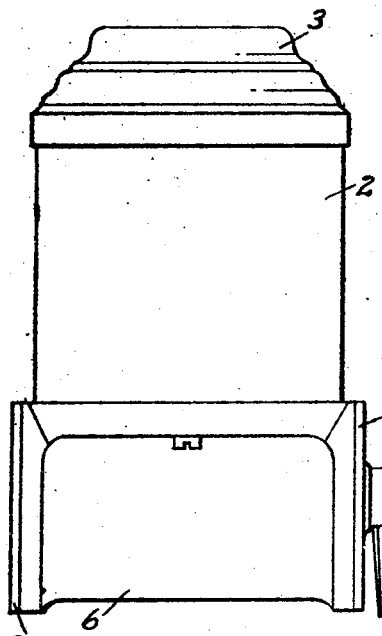
Fig. 6 is a side elevation in a plane at right angles to the plane of Fig. 5.

The invention is here embodied in a device comprising a suitable casing or shell 2, preferably of cylindrical form, and having an open upper end covered with a simple removable cap 3 having a flange 4 fitting the upper end of the shell 2, and having a hollow chamber extending up above the top of the shell to provide clearance for mechanism therein. The lower end of the shell is provided with bottom shoulders 5, and extending transversely along the bottom is a screw chamber 6 of semicircular form, the top of which opens directly into the shell 2. Secured upon the shoulders 5, which are diametrically opposite, is a bridge bar 7 which is here shown as attached to the shoulders by screws 8 passing upwardly through the bottom of the shell. Rotatively journaled in the bridge 7 is an upstanding screw 9 which may have a fixed collar 10 having radial arms 11 carrying a crown gear 12 having downwardly projecting teeth 12$^a$. The collar or hub 10 may be pinned or otherwise fastened on the lower portion of the screw 9 as by a key pin 13. The screw 9 extends upwardly to the top of the shell, and freely slidable along the screw is a follower disc or head 15 which, preferably, is provided with downwardly extending ribs 15ª so that when these ribs are embedded in the substance in the shell, the follower head is prevented from rotation with the screw 9.

To force the follower head down, there is formed upon the same an upwardly extending hub 16 which is provided with a set of pivots 17 extending through radial pockets 16' in the hub 16. On these pivots are mounted lever members having arms 18 extending upwardly and outwardly, and upon the lower portion of the levers are provided jaws 19, the inner faces, adjacent to the screw 9, of which are threaded to operatively connect with the screw 9 so that when the latter is rotated by the gear 12, the follower head will be advanced downwardly and thus force the paste or material in the shell down into the discharge chamber 6.

It is desirable to provide for the ready recovery or retraction of the follower head 15 without necessitating the reverse rotation of the screw 9 to feed the follower head 15 upwardly, and for this purpose there is arranged around the hub 16' a loose ring or collet 20 which is adapted to be shifted freely up and down the hub 16' so that in its upper position, the edge of the collet 20 will strike the outwardly inclined lever arms 18 and this will throw the threaded jaws 19 outwardly from the screw 9.

To facilitate manipulation of the collet 20, it is provided with outwardly extending diametrically opposed finger pieces 20ª to be readily grasped between two fingers when inserted into the shell so that the collet can be lifted to actuate the jaw members 19 as just above described. From this it will be seen that as the gear 12 is rotated, the presser head 15 will be forced down to advance the material in the shell positively into the bottom chamber 6.

In this chamber there is arranged axially a substantial worm or screw 23, one end of which is counter sunk to receive a trunnion 24 in a discharge plate 25 which may be screwed or otherwise fastened as at 26 to one end of the chamber 6. This discharge plate has a discharge aperture 25ª which, preferably, has a radial edge 25ᵇ and a tangential edge 25ᶜ with an arcuate outer edge 25ᵈ thus forming a quadrant-like aperture.

Figure 5:
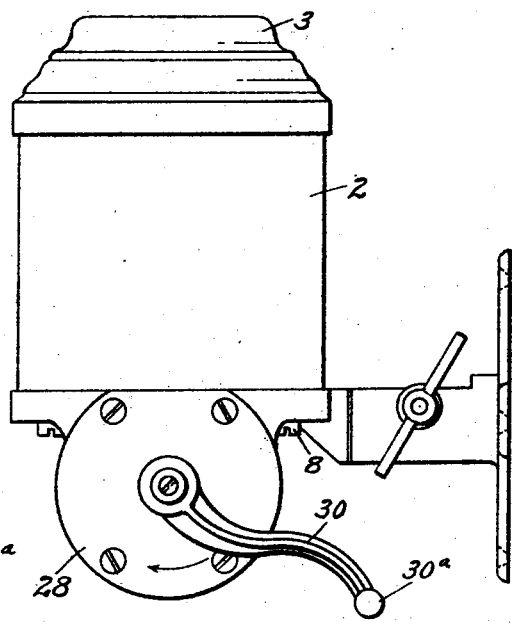
Fig. 5 is a side elevation looking toward the crank end of the device.

The screw 23 has a shaft section 23ª upon which is secured a crown pinion 27 disposed in the chamber 6 and adjacent to a plate 28 fastened to or provided on the contiguous end of the chamber. The shaft 23ª passes through the plate 28 and receives a crank 30 by which the shaft may be rotated. When the crank handle 30ª is in its lowermost position, as in Fig. 1, a shutter 23ᵇ on the discharge end of the screw 23 occupies a position over the outlet opening 25ª in the chamber 6. Rotating the crank in the direction of the arrow as seen in Fig. 5 from its lowermost position, shifts the shutter 23ᵇ from the opening, and the helix of the screw 23 then advances paste from the chamber 6 outwardly through the opening 25ª. One complete rotation of the crank 30 brings the leading edge 23ᶜ of the shutter 23ᵇ across the opening 25ª. This leading edge of the shutter is substantially sharpened to act as a knife for cleanly severing the discharging material. The action of the dispensing screw 23 in one rotation is to advance a predetermined amount of the material according to the purpose for which the device is utilized; for instance when dispensing soap paste, one rotation of the crank 30 and the screw 23 thereof will serve to issue sufficient soap for one service in washing.

The rotation of the screw shaft 23ª serves, by means of the gear 27, to concurrently rotate the advancing screw 9, and this acting upon the jaw members 19 causes the follower head 15 to move down a distance which will result in displacing a charge from the shell 2 into the chamber 6 which is substantially equal to the amount discharged by the screw 23 from the outlet 25ª. This coordination of the advancing means and the expressing screw prevents the excessive transfer of the substance from the shell 2 into the chamber 6 and eliminates compression of the substance in the chamber.

The machine as thus constructed includes a sufficiently air tight container to prevent atmospheric action upon the substance in the shell and by utilizing crown teeth gears, the clogging and jamming of the gearing is eliminated and provides for easy operation of the apparatus. An advantage of the arrangement of the gear mechanism within the shell and chamber compartments, is that these act as mixing and softening agents to facilitate the discharge of the paste from the dispenser.

Further embodiments, modifications and changes may be resorted to within the spirit of the invention as here claimed.

What is claimed is:

1. In a dispensing device, a follower head, a hub extending upwardly from the axial center of the head, lever members pivotally mounted to operate radially in the hub and having arms extending upwardly and outwardly and having jaws extending downwardly and inwardly and provided with segmental screw threads adapted to engage a screw extending through the follower head, a loose ring slidingly mounted upon the hub and adapted to force the jaws inwardly when the ring is moved downwardly, and finger pieces extending upwardly and outwardly from the ring so that when the finger pieces are raised to raise the ring the jaws are released and when the ring is depressed the jaws are forced inwardly and locked.

2. A releasable nut comprising a supporting member having a central opening, a hub extending from the supporting member around the opening, segmental screw threaded jaws pivotally mounted in the hub to swing in radial lines and having handles extending upwardly and outwardly, a ring slidingly mounted for axial movement upon the hub and engaging the jaws so that when the ring is pressed downwardly the jaws are forced inwardly and locked and when the ring is raised the jaws are released, and means for operating the ring.

In testimony whereof I have signed my name to this specification.

FREDERICK TODT.